United States Patent [19]

Hausmann

[11] 4,192,523

[45] Mar. 11, 1980

[54] LOADER VEHICLES

[75] Inventor: Winfried Hausmann, Klein-Lobke, Fed. Rep. of Germany

[73] Assignee: Massey-Ferguson Services N.V., Curacao, Netherlands Antilles

[21] Appl. No.: 937,306

[22] Filed: Apr. 6, 1978

Related U.S. Application Data

[63] Continuation-in-part of Ser. No. 752,955, Dec. 20, 1976, abandoned.

[30] Foreign Application Priority Data

Dec. 24, 1975 [GB] United Kingdom ............... 52927/75

[51] Int. Cl.² ............................................. B62D 53/02
[52] U.S. Cl. .................................... 280/400; 403/135
[58] Field of Search ................... 280/461 R, 400, 488, 280/497, 492; 180/51; 403/122, 135, 137, 138

[56] References Cited

U.S. PATENT DOCUMENTS

| 3,433,502 | 3/1969 | Omon | 180/51 X |
| 3,862,796 | 1/1975 | Bechman | 280/400 |

FOREIGN PATENT DOCUMENTS 1157713  7/1939  United Kingdom ..................... 280/400

Primary Examiner—John A. Pekar
Attorney, Agent, or Firm—William R. Nolte

[57] ABSTRACT

Articulated earthmoving vehicle, e.g. articulated wheel loader comprises two chassis frames, one of which supports the vehicle drive units and the other one the working tools. Both chassis frames are pivotable relative to each other about two joints arranged vertically one above the other for steering the vehicle. Both joints consist of a ball joint of which at least one is adjustable in vertical direction and can accommodate misalignment of the frames at the steering joints.

3 Claims, 5 Drawing Figures

LOADER VEHICLES

This is a continuation in part of application Ser. No. 752,955, filed Dec. 20, 1976 and now abandoned.

The invention relates to an articulated vehicle formed from two frame sections, in particular a wheeled loader, in which one frame section supports the drive unit and the other the working implements, and in which both frame sections move around two hinges arranged one above the other for the purpose of the articulation.

It is known to construct vehicles whereby the frame hinges were designed as forked bearings with continuous bearing journals. Such a design required accurate alignment of the bearing bores. To achieve this accuracy the bores of the frame sections had to be manufactured on horizontal boring mills. This machining of the relatively large frame sections presents considerable difficulties in addition to use of large, suitably designed and adjusted boring mills. This machining of the relatively large frame sections presents considerable difficulties in addition to use of large, suitably designed and adjusted boring mills.

An object of the present invention is to obviate or mitigate the above disadvantages and simplify and make cheaper the production of hinge or rocker bearings used in articulated vehicles.

Another object of the invention is to provide a hinge joint capable of adjusting for misalignment between the frame members by vertical movement of a bearing in one joint member.

Still another object of the invention is to limit the vertical movement of the joint member bearing to permit the joint member to share axial loadings with another joint member.

According to the present invention there is provided an articulated vehicle having two frame sections which may be pivoted relative to each other about an axis, said sections being connected by a pair of vertically spaced joints, each of said joints comprising a ball and a socket, at least one of said joints being adjustable in vertical direction relative to one of said frame sections.

Further, means may be provided to lock the joint bearing in proper elevation or, alternately, means may be provided for limiting the vertical movement of the bearing.

An embodiment of the present invention will now be described by way of example only in which.

Figure 1:
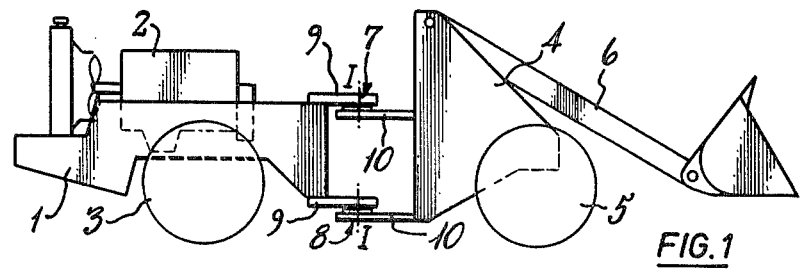
FIG. 1 shows a diagrammatic representation of an articulated vehicle.

The vehicle normally consists of the rear frame 1 supporting the driving unit 2 and the rear wheels 3 and the front carriage 4 with front wheels 5 and working unit 6. For the purpose of articulation the front and rear carriages 1 and 4 are connected to each other by rocker or hinge bearings 7 and 8 arranged above one another on the vertical swivel axis I—I.

Figure 2:
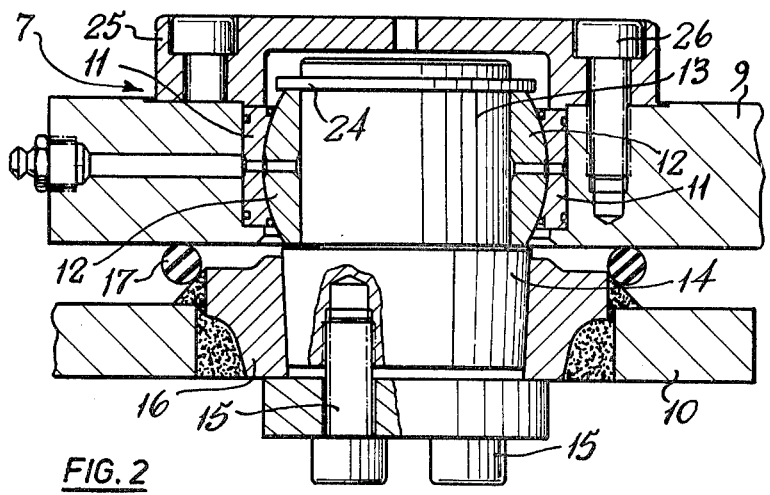
FIG. 2 shows a section through the upper joint.
Figure 3:
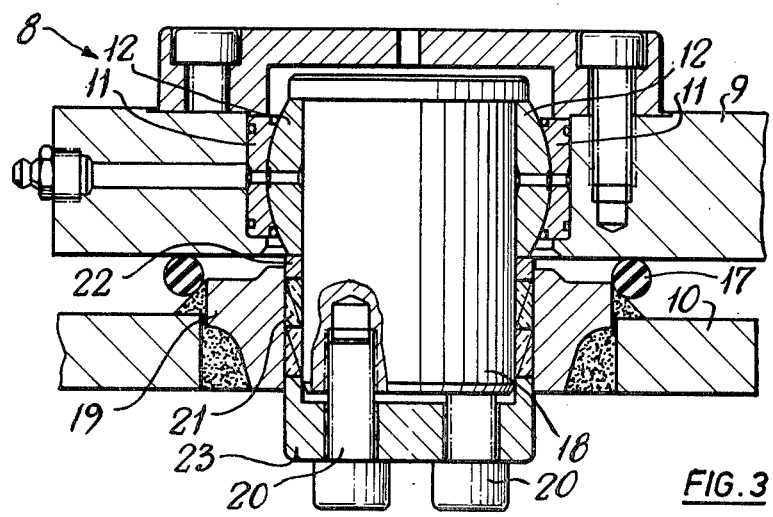
FIG. 3 shows a section through the lower joint.

The upper hinge bearing 7 and the lower hinge bearing 8 are shown in section in FIGS. 2 and 3 respectively. The hinges 7 and 8 each rest in the bearing cheeks 9 provided in rear carriage 1 or in bearing cheeks 10 of front carriage 4. Borings in which ball-like bearing bushes 11 rest to support hinge balls 12 are provided in the cheeks 9. In the upper bearing hinge balls 12 rest on a cylindrical pin 13, on which rests a conical shank 14 tightly clamped in a conical cup 16 by means of screws 15. Cup 16 is secured in cheek 10 attached to front carriage 4. An elastic packing ring or sealing ring 17 is inserted between each of the interacting cheeks 9 and 10 to prevent dirt from penetrating the bearing.

A circlip 24 axially locates the hinge ball 12 on the pin 13 to prevent relative movement in the vertical direction.

The bearing bushes 11 are retained within the cheek 9 by a cap 25 secured to the cheek 9 by bolts 26. Thus relative vertical movement between the cheeks 9 and 10 is prevented.

In the lower bearing 8, the hinge ball 12 rests on a continuous cylindrical pin 18 having an end projecting from hinge ball 12 which is guided and retained in a cylindrical bearing bush 19 having an insertable lining 21. Lining 21 is located between a packing ring 22 and a bearing plate 23, and can be loaded by means of bolts 20. The lining 21 is formed by four wedge shaped elements which operate to expand radially when loaded by a compressive force, thereby retaining the pin 18 in its correct position within the bush 19.

All parts of the bearing may be manufactured as individual parts. The hinge ball in the lower and upper bearing respectively enables deviations in alignment of the axis I—I to be compensated, while deviations in the distance between the centres of the two hinge balls can be compensated for by means of clamping and adjusting bearing journal 18. On the other hand, however, it is immaterial which of the two ball and socket joint pins is axially adjustable and lockable, i.e., if necessary bearings 7 and 8 can be exchanged, or two adjustable bearings according to FIG. 3 may be used.

Figure 4:
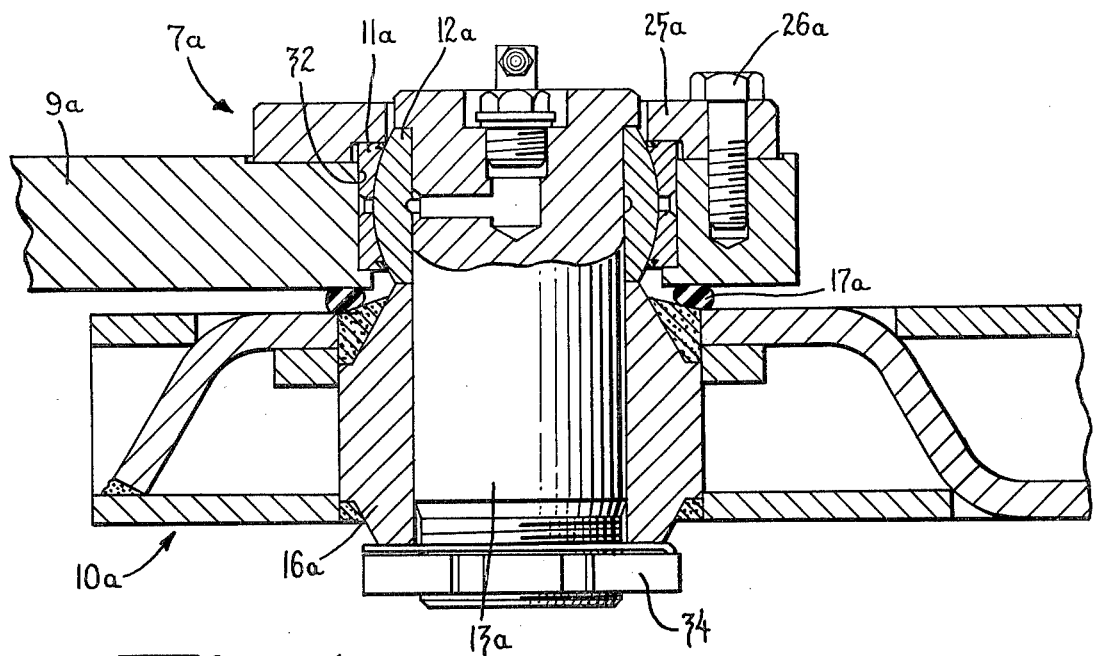
FIG. 4 shows a section through an alternate embodiment of the upper joint.
Figure 5:
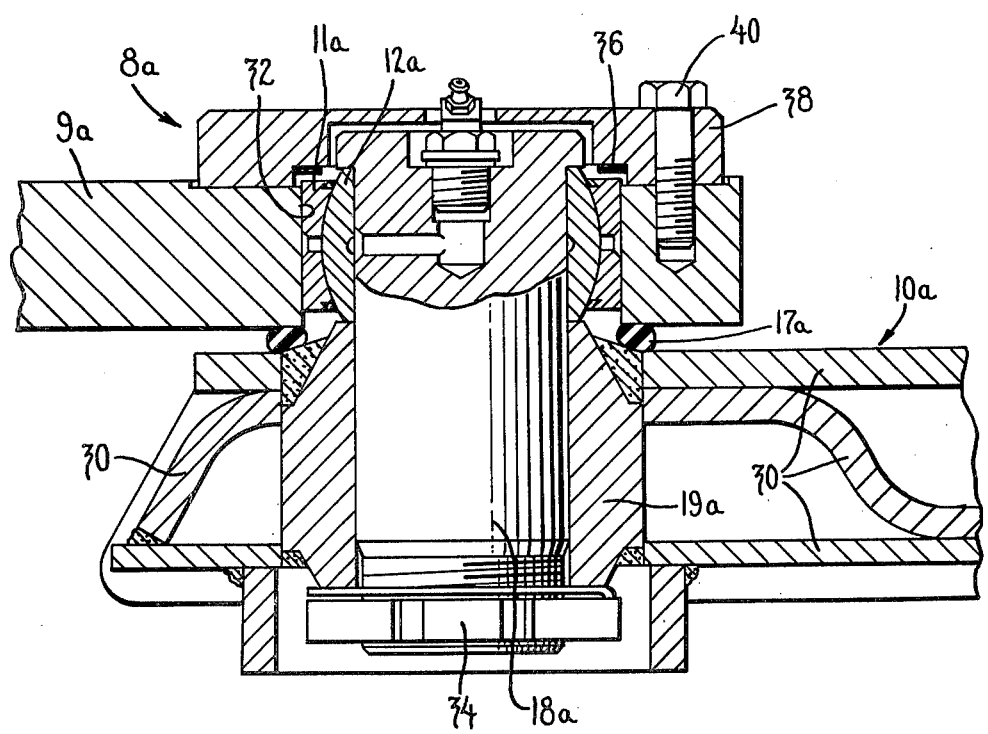
FIG. 5 shows a section through an alternate embodiment of the lower joint.

FIGS. 4 and 5 show sections through alternate embodiments of the upper and lower bearings.

The hinges 7a and 8a each rest in the bearing cheeks 9a provided in rear carriage 1 or in bearing cheeks 10a of front carriage 4. Cheeks 10a are formed from fabricated and welded plates 30. Borings 32 in which ball-like bearing bushes 11a rest to support hinge balls 12a are provided in the cheeks 9a. In the upper bearing hinge balls 12a rest on a cylindrical pin 13a tightly clamped in a cylindrical cup 16a by means of nut 34. Cup 16a is secured in cheek 10a attached to front carriage 4. An elastic packing ring or sealing ring 17a is inserted between each of the interacting cheeks 9a and 10a to prevent dirt from penetrating the bearing.

The bearing bush 11a is retained within the cheek 9a by a cup 25a secured to the cheek 9a by bolts 26a. Thus relative vertical movement between the cheek 9a and bush 11a is prevented.

In the lower bearing 8a, the hinge ball 12a rests on a continuous cylindrical pin 18a having an end projecting from hinge ball 12a which is guided and retained in a cylindrical cup 19a by means of nut 34.

Cup 19a is secured in cheek 10a. The bore 32 in cheek 9a of the lower bearing 8a is a through bore to permit bush 11a to slide therein. The upper limit of travel by the bush 11a is determined by the shims 36 located between the cap 38 and bush 11a. The cap 38 is fixed relative to cheek 9a by bolts 40.

In operation, when the vehicle is digging, it is possible to raise the front wheel 5 off the ground tending to fold the rear and front frames 1 and 4 upwards towards each other. Under these conditions, the socket 11a abuts the shims 36 to prevent further movement and allow the lower bearing 8a to take half of the axial forces previously taken solely by the upper bearing 7a.

What we claim is:

1. An articulated vehicle having two frame sections, one of which supports the drive unit and the other an implement, said frame sections each including first and second arms with opposed overlapping end portions for mounting first and second hinge joints therebetween to enable steering movement between said frame sections, a first ball and socket bearing for said first joint mounted in a first arm of one of said frame sections, a pin interconnecting said first bearing with the other first arm of said other frame section, means locking said first socket bearing against movement in said first arm of said one frame section, a second ball and socket bearing, means defining a bore in the second arm of said one frame section for slidably receiving said second socket bearing therein, a second pin interconnecting said second ball and socket bearing with the second arm of said other frame section, and means connected to said second arm of said one frame and extending across said bore to limit sliding movement of said second socket bearing in one direction.

2. The vehicle of claim 1 wherein said limiting means includes a cap for said bearing.

3. The vehicle of claim 2 wherein said limiting means includes shims between said cap and socket to obtain the correct amount of travel of said socket.

* * * * *